(12) United States Patent
Geus

(10) Patent No.: US 9,008,265 B2
(45) Date of Patent: Apr. 14, 2015

(54) DEVICE FOR DETECTING SUSPICIOUS OBJECTS

(71) Applicant: Smiths Heimann GmbH, Wiesbaden (DE)

(72) Inventor: Georg Geus, Wiesbaden (DE)

(73) Assignee: Smiths Heimann GmbH, Wiesbaden (DE)

( * ) Notice: Subject to any disclaimer, the term of this patent is extended or adjusted under 35 U.S.C. 154(b) by 92 days.

(21) Appl. No.: 13/793,322

(22) Filed: Mar. 11, 2013

(65) Prior Publication Data

US 2013/0188772 A1 Jul. 25, 2013

Related U.S. Application Data

(63) Continuation of application No. PCT/EP2011/004083, filed on Aug. 13, 2011.

(30) Foreign Application Priority Data

Sep. 9, 2010 (DE) .......................... 10 2010 044 802

(51) Int. Cl.
*G01N 23/04* (2006.01)
*G01V 5/00* (2006.01)

(52) U.S. Cl.
CPC .............. *G01N 23/04* (2013.01); *G01V 5/0016* (2013.01)

(58) Field of Classification Search
CPC ...................................................... G01N 23/04
USPC ............................................................. 378/57
See application file for complete search history.

(56) References Cited

U.S. PATENT DOCUMENTS

| 6,663,280 | B2 | 12/2003 | Doenges |
| 2008/0298546 | A1 | 12/2008 | Bueno et al. |
| 2009/0116617 | A1 * | 5/2009 | Mastronardi et al. ........... 378/87 |
| 2011/0170661 | A1 * | 7/2011 | Bueno et al. .................... 378/57 |

FOREIGN PATENT DOCUMENTS

| DE | 101 31 407 A1 | 1/2003 |
| GB | 2 440 937 A | 2/2008 |
| JP | 08-166359 | 6/1996 |

* cited by examiner

*Primary Examiner* — Hoon Song
(74) *Attorney, Agent, or Firm* — Muncy, Geissler, Olds & Lowe, P.C.

(57) ABSTRACT

A device includes a radiation tunnel in which an X-ray source and a detector unit are disposed, the detectors of which are aligned with the X-ray source so as to detect transmitted radiation for detecting suspicious objects. Disposed in the radiation tunnel is a frame which can be moved over an examination region and has two supports which extend at a spacing parallel to each other and are rigidly connected to each other, the radiation source being secured on one vertical support and the detector unit being secured on the other vertical support.

11 Claims, 1 Drawing Sheet

DEVICE FOR DETECTING SUSPICIOUS OBJECTS

This nonprovisional application is a continuation of International Application No. PCT/EP2011/004083, which was filed on Aug. 13, 2011, and which claims priority to German Patent Application No. DE 10 2010 044 802.8, which was filed in Germany on Sep. 9, 2010, and which are both herein incorporated by reference.

BACKGROUND OF THE INVENTION

1. Field of the Invention

The invention relates to a device for detecting suspicious objects, the device includes a radiation tunnel in which an x-ray source and a detector unit are disposed, whose detectors for detecting transmitted radiation are directed toward the x-ray source.

2. Description of the Background Art

As is generally known, scanners, which generate a transmission image of the object to be examined with use of x-rays, are employed as devices for detecting suspicious objects. In so doing, the x-rays not absorbed by the examined object are detected by a detector unit.

In prior-art inspection systems, for example, those described in DE 101 31 407-A, which corresponds to U.S. Pat. No. 6,663,280, which is incorporated herein by reference, and in which a suitably designed conveyor belt moves the items of luggage to be inspected through the radiation tunnel, in which one or more radiation sources and detector units directed toward them are disposed.

The use of known devices for screening persons, for example, flight passengers, for suspicious objects, however, is associated with the following disadvantages:

In order to reach the conveyor belt, the person to be screened must climb over a step. Although the height difference to be overcome can be kept small by a suitable design of the device, it poses difficulties particularly for elderly or disabled persons.

At the start-up of the conveyor belt for the screening and during braking following the screening, individuals are exposed to acceleration forces. The acceleration forces can in fact be reduced by an appropriate conveyor belt operating mode, but pose problems particularly for individuals with physical impairments. There is the risk that individuals lose their balance.

The relative speed between the conveyor belt and the x-rays must be kept very precise to keep the x-ray dose per scan interval at the desired low values. The precise maintenance of the relative speed can be detrimentally affected by disruptive factors such as soiling of the belt or a change in belt speed caused by the different weight of individuals or by shifts in weight such as movements by individuals.

SUMMARY OF THE INVENTION

It is therefore an object of the invention to provide a generic type device which is suitable for screening individuals, assures a precise relative speed between the person and the x-radiation within the screening area, and at the same time eliminates the endangerment of elderly and disabled individuals in particular during the screening.

In an embodiment, a device is provided that has a radiation tunnel, in which a frame movable over a screening area is disposed, the frame having two supports extending vertically and parallel at a distance to one another and rigidly connected to one another. The radiation source is secured to one vertical support and the detector unit to the other.

According to an embodiment of the invention, the radiation source with the detector unit directed toward it moves around the person to be screened. The movement of the radiation source and the detector unit thereby occurs preferably in an arcuate manner along an arc. To this end, the frame can be rotated around a central vertical axis. One of the vertical supports, preferably the support with the radiation source, is connected to the axis, preferably secured to said axis. Alternatively, it is also possible to design the frame with the vertical supports to be movable linearly over a screening area.

The frame with the two supports can be rotated around the central axis along a segment of a circle, which ranges from about 30° to almost 360°. It has proven advantageous when the two supports are rotated by means of a rotary drive by about 180°.

Accordingly, the radiation tunnel can also be designed with a floor area in the shape of a circle sector. The size of the circle sector and thus of the radiation tunnel ranges from about 30° to approximately a full circle. A small circle sector has the advantage of a small area requirement and is thus used preferably in limited spaces. A radiation tunnel with a floor area, which approaches a full circle, has the advantage that there are only small openings through which the x-rays can leak outward. It can be designed approximately as a labyrinth system with a very small outer dose load.

As an alternative, the frame can also be designed so that it can be moved linearly over the screening area. Preferably, it is then hung in linear guides, which are disposed running above the screening area. This design is more costly than the design with the arcuate movement of the frame.

A screening tunnel, which the person to be screened enters, can be disposed within the shielded radiation tunnel. The side walls of the screening tunnel are made of materials easily penetrated by x-rays. The two supports of the frame then move in the intermediate space between the radiation tunnel and the screening tunnel. The shape of the screening tunnel is adjusted to the shape of the radiation tunnel. If the floor area of the radiation tunnel has the shape of a circle sector, then the floor area of the screening tunnel preferably has the shape of a circular ring sector with a slightly smaller outer radius.

The screening can occur with x-rays, which are emitted fan-shaped in a vertical radiation plane, toward which a vertical detector row is directed. To this end, a radiation source having at least one collimator is secured to one of the vertical supports, and the other vertical support bears at least one vertical detector row.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
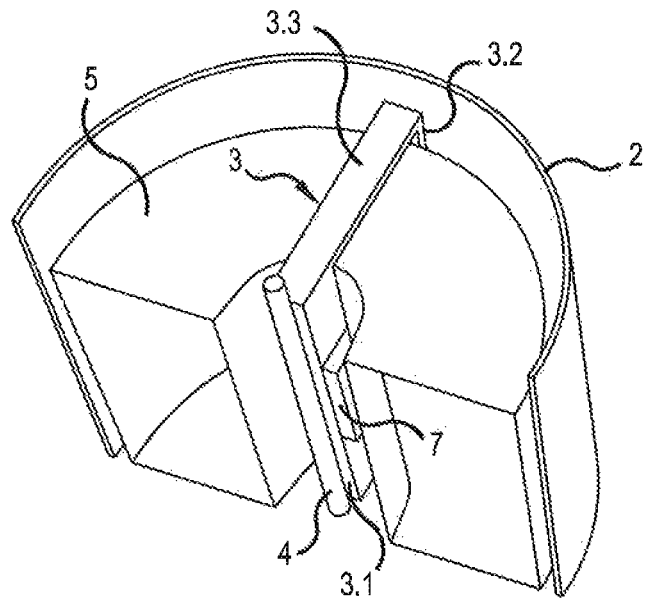
FIGS. 1 and 2 show, each in an oblique view, a device according to an embodiment the invention with a radiation tunnel with a semicircular floor area.
Figure 2:
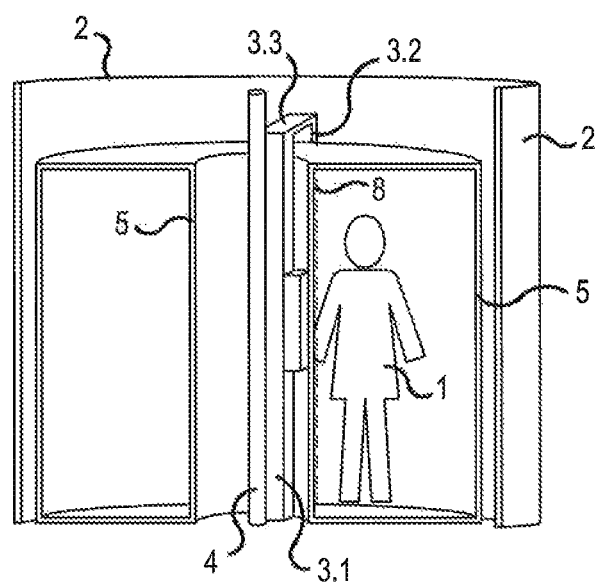

The device illustrated in the drawing is used for screening persons 1 for carried suspicious objects. It is used, for example, in airports to screen flight passengers. The device is designed as a scanner, which generates a transmission image with low-dose x-rays in an energy range from 10 to 500 KeV. The fading in or out of different energy ranges from the aforementioned radiation spectrum is possible by suitable radiation filters and adapted radiation detectors.

The device contains a radiation tunnel 2, whose floor area has the shape of a circle sector. The vertical outer wall of radiation tunnel 2 is designed so that it shields the x-rays. To this end, it contains an x-ray-absorbing material. The outer wall has the shape of a cylindrical shell, whereby the floor area and the outer wall are designed so that an angle greater than 30° to approximately a full circle is covered. Preferably, the floor area has the shape of a semicircle or nearly a semicircle; accordingly, the outer wall extends over an angle range of 180° or nearly 180°.

A frame 3 movable over the screening area is disposed in radiation tunnel 2. Frame 3 has two supports 3.1, 3.2 extending vertically and parallel at a distance to one another and securely connected to one another. In the exemplary embodiment, the two vertical supports 3.1, 3.2 are connected to one another by a cross member 3.3. The radiation source 7 is secured to one vertical support 3.1, and the detector unit 8 to the other vertical support 3.2. The two connected supports 3.1, 3.2 are moved by means of a drive over the screening area in which person 1 to be screened is located during the scanning process. In the preferred exemplary embodiment, frame 3 is pivotable around central axis 4 by means of a rotary drive. One of the vertical supports, preferably support 3.1 with the radiation source, is secured to central axis 4. The other support 3.2 swivels synchronously, so that the detectors secured to it always remain directed toward the radiation source. The screening area is located between the two vertical supports 3.1, 3.2.

To perform a scanning process, a radiation source with at least one collimator, which emits x-rays in a vertical radiation plane, is secured to the inner vertical support 3.1. The radiation plane is directed toward a vertical detector row, which is secured to the outer vertical support 3.2.

A screening tunnel 5, whose side wall is manufactured from materials readily penetrated by x-rays and has a shape corresponding to the outer wall of radiation tunnel 2, is disposed within radiation tunnel 2.

Thin-walled aluminum sheets or thin molded parts made of plastic with a low absorption behavior are typically used at this place. The two vertical supports 3.1, 3.2 of frame 2 with the radiation source and the detector unit move in the intermediate space between radiation tunnel 2 and screening tunnel 5, so that they are not visible to person 1 to be screened during the screening. The screening process begins with the operator requesting person 1 to be checked to place himself in the screening area, located in the middle area of screening tunnel 2, with his back or front toward the outer tunnel wall. This position can be marked on this wall in a suitable manner. Then, the operator starts the scanning process, during which the frame structure, not visible to person 1 being screened, moves over the screening area.

During the movement, transmission data are received from the detector unit row by row. After the screening is completed, the operator asks person 1 to be screened to leave screening tunnel 5. After the transmission images have been evaluated, the next person 1 is asked to enter screening tunnel 5. It is possible to close the screening tunnel with doors during the screening process. This can possibly have an advantageous effect for the organization process and for minimizing radiation in the outer area.

Because frame 3 is in the end position from the prior screening, it is moved backwards for the next screening. It is not necessary to move frame 3 back to a starting position before a screening. During the screening session with backwards-moving frame 3, only a simple mirroring of the image display electronically is necessary to obtain a view for all images in the same way.

In an alternative embodiment, the movement of the radiation source and the detector unit during scanning occurs not along a circular arc but linearly. In this embodiment, frame 3 can be moved linearly with the vertical supports 3.1, 3.2 over the screening area. To this end, frame 3 is hung in linear guides, which are disposed running above the screening area. Radiation tunnel 2 also runs in a straight line matching the movement of frame 3 and not in a curved manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for detecting suspicious objects, the device comprising:
   a radiation tunnel;
   an x-ray source and a detector unit disposed arranged in the radiation tunnel, the detector unit comprising detectors, for detecting transmitted radiation, directed toward the x-ray source; and
   a frame arranged in the radiation tunnel, the frame being movable over a screening area, the frame comprising two vertical supports extending vertically and parallel at a distance from one another and rigidly connected to one another,
   wherein the x-ray source is secured to one of the vertical supports and the detector unit is secure to an other of the vertical supports, and
   wherein the frame is adapted to be rotatable around a central vertical axis to which one of the vertical supports with the x-ray source is connected.

2. The device according to claim 1, wherein the vertical supports are connectable to one another by a cross member.

3. The device according to claim 1, wherein the floor area of the radiation tunnel has a shape of a circle sector, a shape of a semicircle, or nearly a semicircle.

4. The device according to claim 1, wherein the radiation tunnel has an outer wall, which contains an x-ray-absorbing material.

5. The device according to claim 1, wherein, within the radiation tunnel, a screening tunnel is arranged, whose side walls are manufactured from materials readily penetrated by x-rays, and wherein the vertical supports of the frame with the radiation source and the detector unit each move in an intermediate space between the radiation tunnel and the screening tunnel.

6. The device according to claim 1, wherein a radiation source with at least one collimator, which emits x-rays in a vertical radiation plane, is secured to one vertical support, and wherein the radiation plane is directed toward a vertical detector row, which is secured to the other vertical support.

7. The device according to claim 1, wherein the frame is adapted to be moveable in an arcuate manner along an arc path.

8. The device according to claim 1, wherein said one of the vertical supports is secured to the central axis.

9. The device according to claim 1, wherein the frame is adapted to be rotated from 30° to 360°.

10. The device according to claim 1, further comprising a screening tunnel arranged within the radiation tunnel.

11. The device according to claim 10, wherein the vertical supports of the frame each move in an intermediate space between the radiation tunnel and the screening tunnel.

* * * * *